United States Patent [19]

Davies et al.

[11] 3,989,575

[45] Nov. 2, 1976

[54] SPLIT LABELING APPARATUS

[75] Inventors: John R. Davies, Grand Rapids; Kornelis Platteschorre, Grandville, both of Mich.

[73] Assignee: Oliver Machinery Company, Grand Rapids, Mich.

[22] Filed: Apr. 16, 1975

[21] Appl. No.: 568,505

[52] U.S. Cl. .................................. 156/355; 83/620; 83/636; 156/521

[51] Int. Cl.$^2$ ...................... B26D 5/00; B32B 31/00

[58] Field of Search .......... 156/256, 259, 271, 521, 156/353, 354, 355; 83/832, 848, 620, 636

[56] References Cited

UNITED STATES PATENTS

| | | | |
|---|---|---|---|
| 875,067 | 12/1907 | Green | 83/636 |
| 2,444,685 | 7/1948 | Waters | 156/271 |
| 3,527,632 | 9/1970 | Holes et al. | 156/271 |
| 3,536,550 | 10/1970 | Hofe | 156/354 |
| 3,556,909 | 1/1971 | Stegman | 156/521 |
| 3,707,424 | 12/1972 | Artelt | 156/259 |

*Primary Examiner*—Douglas J. Drummond
*Attorney, Agent, or Firm*—Price, Heneveld, Huizenga & Cooper

[57] ABSTRACT

A split labeling apparatus and method for cutting and transferring pairs of individual labels from a double label web in preparation for separate, simultaneous application to product surfaces. The double label web is provided in roll form, is advanced through divider means for splitting the web into like longitudinal strips, and on to a cut-off means where a pair of individual labels are simultaneously removed, one from each strip. The cut-off means includes a cutting blade which prévents the strips from twisting. Each pair of cut labels is transferred from the cutting location by a pair of label separators which spread the labels apart during transfer. A second, simultaneously operating, anti-twist cutting blade is included to remove any periodically occurring scrap section from the web.

15 Claims, 13 Drawing Figures

SPLIT LABELING APPARATUS

BACKGROUND OF THE INVENTION

This invention relates to labeling machines, and, more particularly, to labeling apparatus for simultaneously cutting and transferring pairs of labels from an advancing label roll in order to increase label application speed while maintaining the security of applying the correct label to the correct product surface.

In recent years, demand has risen for labeling machines which can cut and apply labels to various products at higher and higher rates of speed. In certain industries, such as the pharmaceutical industry, the problem of faster label application is complicated by the fact that labels must be applied extremely accurately to containers for drugs, medicines, and the like to prevent mislabeling.

One method for increasing labeling speed has been to attach labels to more than one product at a time. Specifically, the conventionally known processes utilizing such simultaneous application have required the individual cutting and stacking of separate label strips into labels which are thereafter applied to the product surfaces simultaneously. A problem with this method, however, is that of assuring that the correct labels are applied to the correct products. Because of the possibility for error in the lableing, such plural attachment has been undesirable. Moreover, the necessity of cutting and individually stacking labels prior to plural application has been both inefficient and expensive.

It has now been found, however, that the present invention allows the use of the plural labeling concept. The speed and efficiency of the labeling process is greatly increased while the security of attaching the correct label to the correct product surface during such plural application is maintained.

SUMMARY OF THE INVENTION

Accordingly, it is an object and purpose of the present invention to provide an apparatus and method for cutting and transferring individual labels in preparation for simultaneous application to a plurality of product surfaces to increase the efficiency of the labeling operation while maintaining labeling security. The invention utilizes a double label web roll including pairs of identical labels across the width of the web. The double web is advanced through slitting, cutting, and transfer operations whereby the label web is split into two longitudinal strips, pair of labels are simultaneously cut from the strips, one from each strip, and the individual labels are transferred to a label application station. The present invention doubles the efficiency of prior known methods because two labels may be cut and applied simultaneously. At the same time, the security of the labeling operation is guaranteed since identical labels are cut from a label roll which includes thereon only the single type of label.

In one aspect, the present split labeling apparatus comprises a means for advancing an elongated double label web, divider means for splitting the advancing double label web longitudinally into a pair of like strips, and label cut-off means downstream of the dividing means for simultaneously cutting off a pair of like individual labels from the said strips, one label being cut from each strip. Label transfer means are provided for transferring the pair of individual cut labels from the cut-off means to a label application station where the individual labels are applied to articles or product surfaces.

In the preferred embodiment, the divider means includes opposing, circular, shearing members which are rotated with respect to one another through the label web to cut the web longitudinally along its center. The cut-off means includes knife means having a pair of blades which operate simultaneously to both cut the labels from the strip and separate any periodically occurring scrap sections which occur if the double label web in printed with the offset printing method utilizing a circular printing roller. Each of the two blades of the knife means prevents the strip it cuts from twisting, and each includes a cutting virtix which initiates the cutting of each of the two strips from its center outwardly to its lateral edges.

The label transfer means includes a pair of label separators and spreading means for changing the spacing between the separators and thus of said pair of individual labels to prepare the labels for transfer to the label application station. Means for elevating the separators while they are being spread are also included.

In another aspect, the invention comprises the method of advancing a double label web, splitting the advancing label web into two like strips while continuing to advance the strips, and simultaneously cutting off individual labels from both of the strips after the web is split.

These and other objects, advantages, purposes, and features of the invention will become more apparent from a study of the following description taken in conjunction with the drawings.

DESCRIPTION OF THE PREFERRED EMBODIMENT

Label Unwind, Imprint And Feed Control Apparatus

Figures 1, 2, 6:
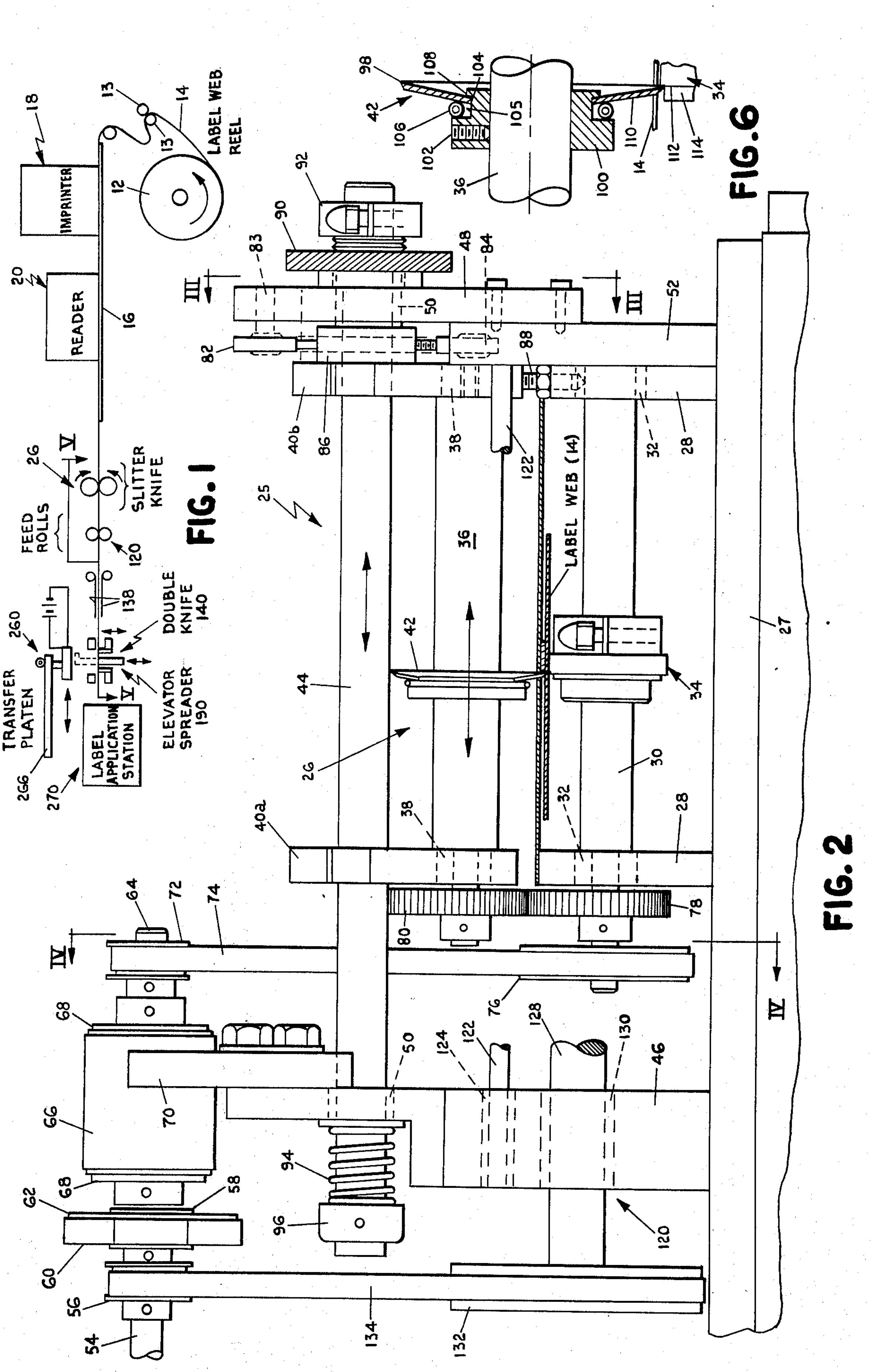
FIG. 1 is a schematic illustration of the labeling apparatus of the present invention.
FIG. 2 is a front elevation of the double label web dividing means of the present invention.
FIG. 6 is an enlarged sectional view of the circular slitting blade and apparatus for mounting the same.
Figures 3, 4, 5:
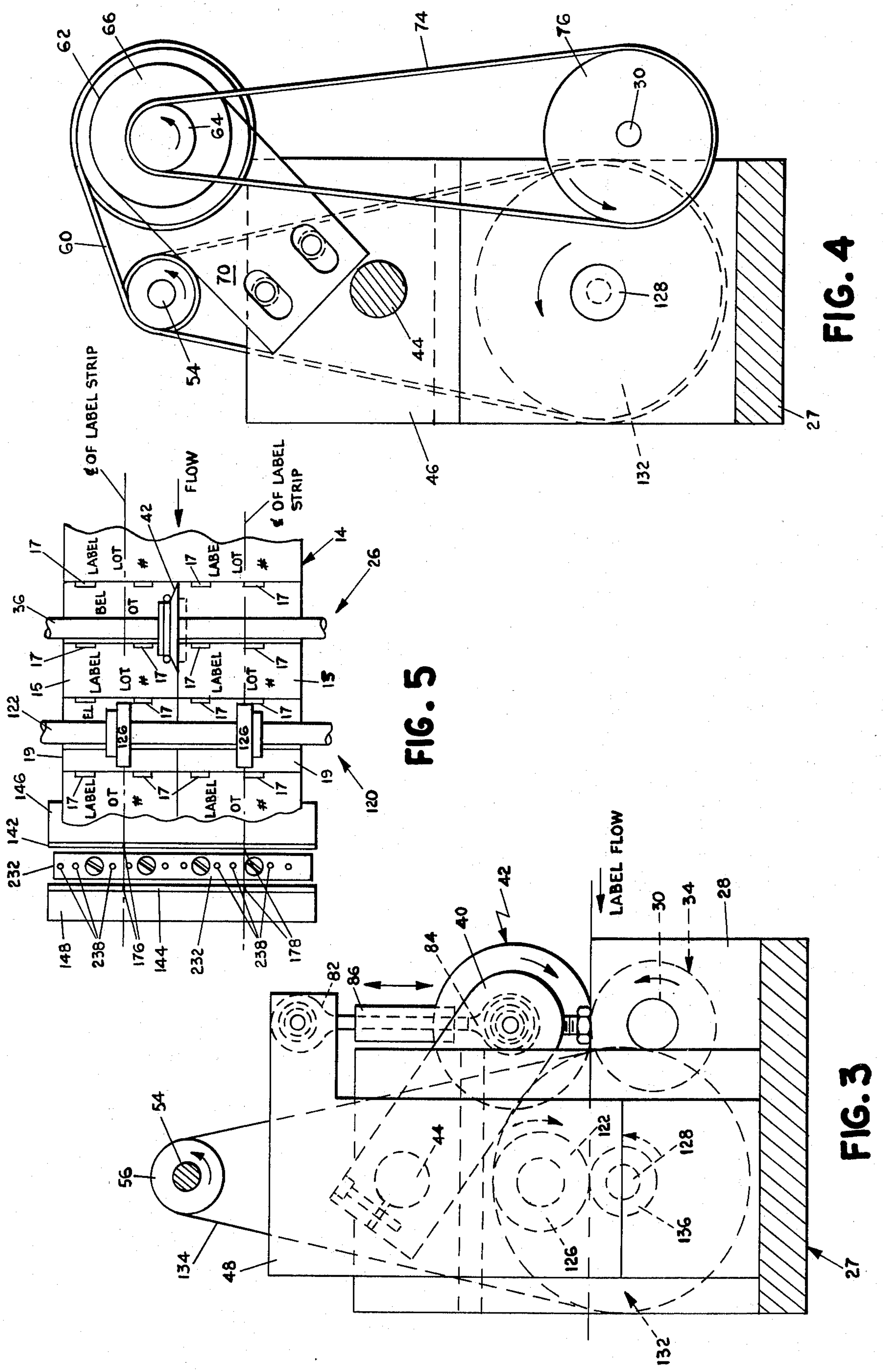
FIG. 3 is a sectional view of the dividing means taken along plane III—III of FIG. 2 and also showing the feed roller means downstream of the dividing means.
FIG. 4 is another sectional view taken along plane IV–IV of FIG. 2 and illustrating the drive means for the dividing and feed roller means.
FIG. 5 is a plan view of the dividing means, feed roller means, cut-off means, and label transfer means taken along line V—V of FIG. 1.

Referring to FIG. 1, the present split labeling apparatus 10 is generally a modification of the label infeed apparatus of the invention disclosed and claimed in U.S. Pat. No. 3,843,440, assigned to the same assignee as the present invention, such being issued on Oct. 22, 1974, entitled LABELING MACHINE, the disclosure of which is incorporated by reference herein. The present apparatus includes a reel 12 on which is mounted the double label web roll from which is withdrawn the double label web 14 for advancement through the cutting and transfer operations more fully described below. As described in U.S. Pat. No. 3,843,440, the apparatus may include means such as opposing rollers 13 for automatically unwinding and feeding the label web. Once unwound, the double label web is pulled along support plate 16 by the combined rotation of the feed rolls 120 and slitting or divider means 26 beneath an imprinter 18 mounted atop plate 16. Imprinter 18 is of the type disclosed in U.S. Pat. No. 3,586,570 issued to W. H. Solomon et al on June 22, 1971, and entitled LABELING MACHINE, the disclosure of which is also incorporated by reference herein. Imprinter 18 imprints information on each of the labels on the double web. Thus, information such as the expiration date of the drug or medicine, the batch number, labeling date, and the like is imprinted on each of the aligned labels 15 extending across the width of the label web 14 as shown in FIG. 5.

After being imprinted, the double label web is pulled through reader unit 20 also supported above plate 16. The reader is substantially the same as that described in U.S. Pat. No. 3,843,440. Reader 20 verifies the imprinting of the expiration date, lot number, labeling date, and the like on each pair of labels and coordinates the label feed through divider means 26 to cut-off means 140 and transfer means 190 by reading the register marks 17 (FIG. 5) previously printed on the edge of each of the individual labels 15. The reader apparatus 20 utilizes bifurcated, light-transmitting, fiber-optic cables which transmit light and read reflected light from the areas imprinted by imprinter 18. The reflected light is transmitted to a readout unit (not shown) where the contrast or difference in light intensity between the white and darker areas is compared. If the contrast or difference in light intensity is above a certain limit, the readout unit indicates the pair of labels have both been printed with an imprint from inprinter 18, and the label pair is then allowed to continue through the dividing and cutting operations. If an imprint is indicated as being missing from either label in the pair, the readout unit stops the advance of the label web at that point.

Also included in the reader apparatus is a separation reading unit including an ultraviolet illuminating source which illuminates the register marks 17 on the individual labels. The illuminated register marks provide light through fiber-optic cables to the read-out unit which, when the reflected light transmitted by the cables is received, deactivates the drive means for feed rollers 120 and divider means 26 to stop the advance of the label web. During such stopped periods, the reader unit verifies the information imprinted by the label printer 18. Such stopping also accurately positions the lead label pair in cut-off means 140 for cutting since the reader unit is adjusted to a position an exact, preset distance away from the cutting blades in cut-off means 140. The double labels on web 14 are typically printed by the offset method and thus include a label pattern pattern repeated cyclically having periodically occurring scrap sections 19 (FIG. 5). Thus, the stopping of the lead label pair for cutting also positions the periodically occurring, regularly spaced scrap sections 19 for cutting as will be more fully described below.

After cut-off apparatus 140 operates through one cutting stroke to separate the lead label pair and any scrap sections from the web, a knife drive cam (not shown) activates a synchronizing switch (not shown) which activates elevating and spreading transfer apparatus 190. Apparatus 190 is raised to transfer the pair of labels to platen 260 and is lowered, activating another synchronizing switch (not shown). The signal from the latter switch activates the drive means for feed roller means 120 and divider means 26 to feed another label pair into cut-off means 140 until stopped by sensing of the registry marks 17 through means of reader 20 in the manner described above. Simultaneously, platen 260 is transferred to label application station 270 where the labels are applied to products. Accordingly, the double label web 14 is intermittently advanced through the dividing and cutting operations as controlled by the reader unit 20.

Power for unwind mechanism 13, imprinter 18, cut-off means 140, label transfer means 190 and 260 and the label application mechanism at label application station 270 is supplied by a main drive and other motors and suitable drive train and camming mechanisms (not shown). Reader 20 controls the intermittent operation of divider means 26 and feed roller means 120 through a separate electric motor as described hereinafter.

Divider And Feed Roller Apparatus

Following an appropriate signal from the drive synchronizing switch after cyclical operation of the cut-off and transfer apparatus, the double label web is advanced and slit longitudinally along its center by the combined operation of the divider means 26 and feed roller means 50 mounted together as slitter and feed unit 25 shown in FIGS. 2–5. Divider means 26 includes a lower base plate 27 and a pair of upstanding, lower frame sides 28 mounted generally perpendicularly thereabove. Spaced above plate 27 is a female knife member support shaft 30 rotatably mounted in suitable ball bearings 32 secured in lower frame sides 28. Shaft 30 supports circular female knife member 34 thereon immediately below label web 14. Spaced above the label web is the circular male knife support shaft 36 which is rotatably mounted in suitable ball bearings 38 in upper knife arms **40*a* and 40*b*. Circular male knife 42 is secured along shaft 36 in opposition to and in cutting engagement with female knife member 34 therebelow. Upper knife support arms 40*a*, 40*b* are in turn fixedly secured to upper knife support shaft 44 which is rotatably secured between top knife frame side 46 and support plate 48 in suitable bearings 50. Support plate 48 is secured to the right-hand lower frame side 28 via an intermediate plate 52 as shown in FIG. 2.**

Power for rotating male knife blade 42 with respect to female knife blade 34 is supplied as shown in FIGS. 2–4. Drive pulleys 56 and 58 are fixedly secured on the end of motor shaft 54. An electric motor (not shown) controlled by reader 20 rotates shaft 54. Timing belt 60 extends from the outer drive pulley 58 to a follower pulley 62 mounted on one end of pulley shaft 64 which is rotatably mounted in a bearing housing 66 via suitable bearings 68. Bearing housing 66 is supported above top knife frame side 46 by a support plate 70 bolted to the top of side 46. A pulley 72 mounted on the remaining end of pulley shaft 64 supports a timing belt 74 which rotates female knife member support shaft 30 via pulley 76 mounted on the extending end of shaft 30. Rotational motion from shaft 30 is transferred via a molded spur gear 78 to a similar molded spur gear 80 mounted on the end of upper male knife support shaft 36 which extends through upper knife arm 40*a*. Accordingly, male and female knife members 42 and 43, respectively, are driven in counter-rotational directions as shown in FIG. 3.

Adjustment apparatus for the male knife 42 with respect to the female knife member 34 includes rod end bearings 82 and 84 threadedly connected by an adjusting link nut 86 as shown in FIGS. 2 and 3. Rod end bearing 82 is rotatably secured on shaft 83 to an extending flange of support plate 48 while rod end bearing 84 is secured to the extending end of male knife support shaft 36. Accordingly, rotation of adjusting link nut 86 either raises or lowers blade 42 by rotating shaft 36 and knife arms 40*a* and 40*b* on shaft 44 in bearings 50. An adjustable threaded stop stud 88 is provided beneath knife arm 40*b* for rapid location and adjustment of male knife 42 with respect to female knife member 34.

Lateral adjustment of male knife 42 against female knife member 34 is accomplished via a self-locking bearing nut 90 clamped to the end of shaft 44 with threaded clamp 92. Rotation of bearing nut 90 laterally shifts shaft 44 and thus knife arms 40*a* and 40*b*, shaft 36 and male knife 42 from side to side against the biasing force of coil spring 94 held in place on the opposite end of shaft 44 by set collar 96.

As shown in FIG. 6, male knife 42 includes a circular blade having a sharp outer, annular cutting edge 98 lying generally in a single, vertical plane. Blade 42 is slidably mounted via central aperture 104 on an extending shoulder 105 of mounting collar 100 which is fixedly secured on shaft 36 via set screw 102. An annular coil spring 106, which has a normal diameter less than that of shoulder 105, contracts around shoulder 105. This forces blade 42 outwardly against flange 108 on the shoulder end because of the inclined or beveled rear surface 110 provided by the dished or convex contour of the blade 42.

Using adjusting link 86, shaft 36 and thus male blade 42 are adjusted such that sharp, annular edge 98 engages annular wall 112 provided by recessed, annular notch 114 in female member 34. Annular wall 112 lies in a single, vertical plane parallel to the plane including annular edge 98. Accordingly, the annular edge 98 cuts through the label web 14 as shown in FIG. 6 by the rotational shearing engagement of that edge with wall 112. Such rotational shearing prevents ripping, tearing, or other damage to the web. Constant cutting engagement is maintained by the biasing action of spring 106 forcing blade 42 against wall 112.

Also included in slitting and feeding unit 25 are feed roller means 120 shown in FIGS. 1, 2, 3, and 5. Feed roller means 120 include a freely rotatable, upper feed roller shaft 122 rotatably mounted in suitable bearings 124 between top knife frame side 46 and intermediate plate 52. A pair of top feed rollers 126 are fixedly secured to shaft 122, one centered over each of the longitudinal strips into which the double label web has been divided by circular male knife 42. Beneath the label web is a lower feed roller support shaft 128 mounted in suitable bearings 130 between side 46 and lower frame side 28. The end of shaft 128 extends beyond side 46 and includes a pulley 132 over which is secured timing belt 134 extending to drive pulley 56. A lower feed roller 130, extending beneath substantially the entire width of the label web 14, is mounted on lower shaft 128. The diameters of pulleys 56 and 132 are chosen such that the rotational speed of the surfaces of the feed rollers 126, 136, which oppose one another and grip web 14 therebetween, is no faster than (i.e., equal to or less than) the rotational speeds of the cutting surfaces of male knife 42 and female knife member 34. Thus, as the feed rollers 126, 136 and the slitting knives draw the label web 14 through the apparatus and divide or slit the web into two like longitudinal strips as shown in FIG. 2, the label web is not place in tension or otherwise stressed or damaged since both the divider 26 in rotating slightly faster than the feed rollers 120 will cut the web free.

Label Cut-Off Apparatus With Anti-Twist Blades

Figure 9:
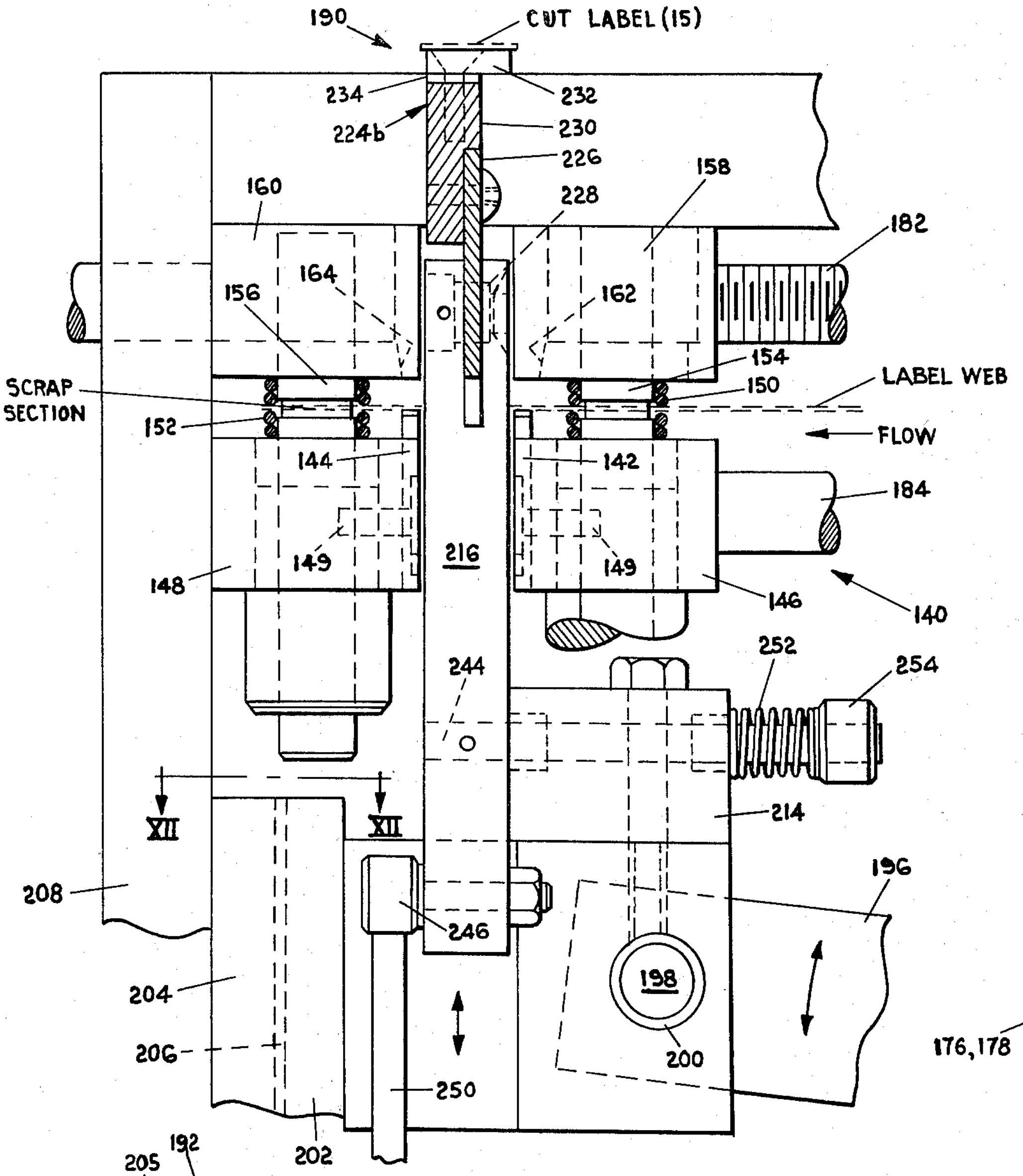
FIG. 9 is a fragmentary, side elevation of the label cut-off means and the label transfer means.

Following the slitting operation in divider 26, the label strips are fed as controlled by reader 20 in edge-to-edge relationship generally in the same plane through feed roller means 120 to cut-off means 140. As is best seen in FIG. 9, the cut-off means 140 comprises a double-bladed knife apparatus having a pair of blades 142 and 144 which are operated simultaneously to separate pairs of individual labels 15 from the remainder of the label web 14 as well as any periodically occurring scrap section 19 from the individual labels. The mechanism for simultaneously raising and lowering the pair of knife blades is to the type described in U.S. Pat. No. 3,843,440 mentioned above and incorporated by reference herein.

Figure 8:
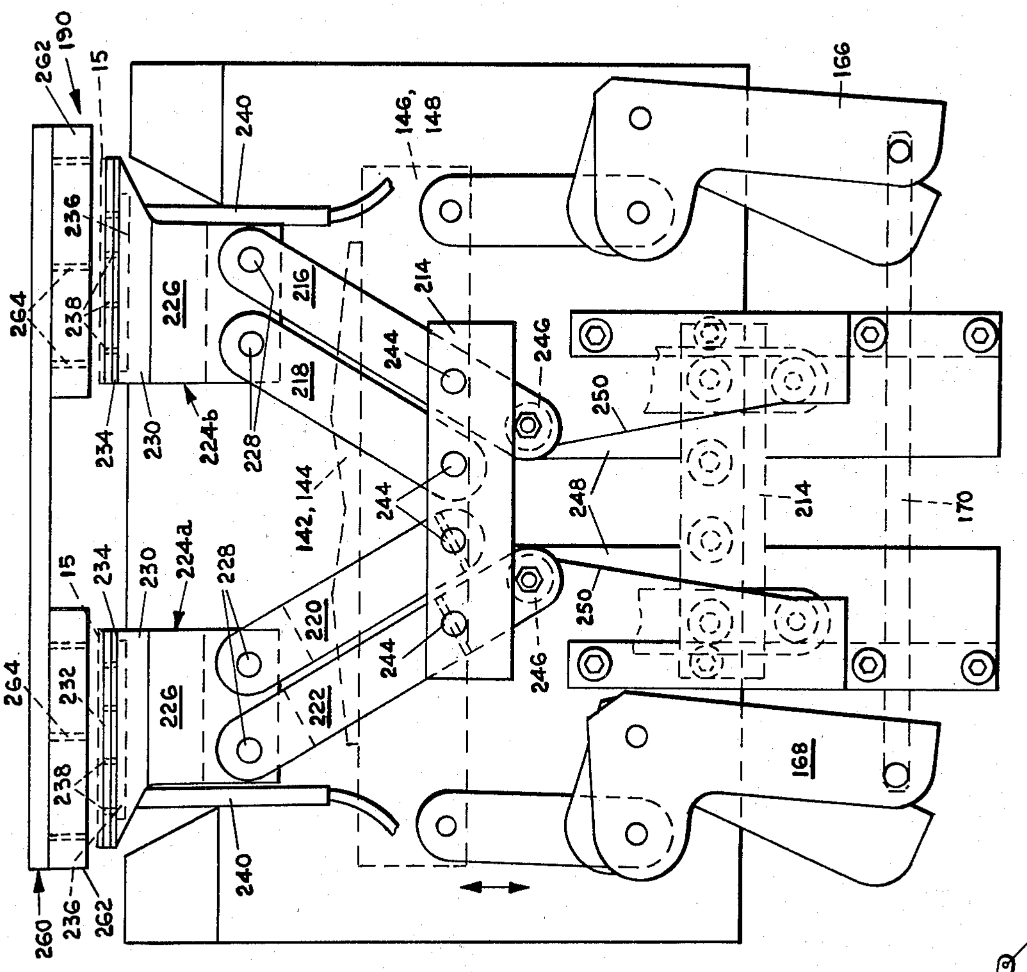
FIG. 8 is a front elevation of the label separators including the spreading and elevating means therefor showing the separators in both their raises and lowered positions.

Knife blades 142, 144 are respectively secured on knife blade mounting blocks 146, 148, respectively, which blocks are reciprocated in unison against the biasing force of coil springs 150, 152 located around guide posts 154, 156. Guide posts 154, 156 extend into knife edge blocks 158, 160 each including a knife edge 162, 164, respectively, which engage blades 142, 144 on their upward strokes. As shown in FIG. 8, camming apparatus, as is fully described in U.S. Pat. No. 3,843,440, including pivot arms 166, 168 connected by cross link 170, pivotally secured to mounting blocks 146, 148 and operated by an appropriate cam and linking mechanism powered by the main motor for the labeling apparatus (not shown) simultaneously reciprocates the knife blade mounting blocks 146, 148 and blades 142, 144 against knife edges 162, 164 which extend over the entire width of web 14 to cut the label and scrap sections. First blade 142 separates the individual labels 15 in each lead pair on the label web 14 (see FIG. 5) whereas the second blade 144 separates any periodically occurring scrap section 19 across the entire width of the double label web.

Figure 11:
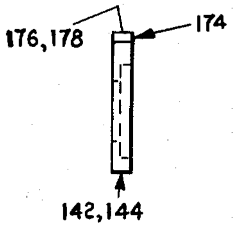
FIG. 11 is a side elevation of the cutting blade shown in FIG. 10.
Figure 12:
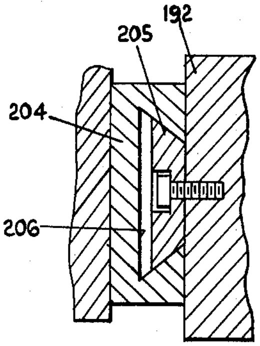
FIG. 12 is a fragmentary, sectional view of the means for guiding vertical movement of the label separators.
Figure 10:
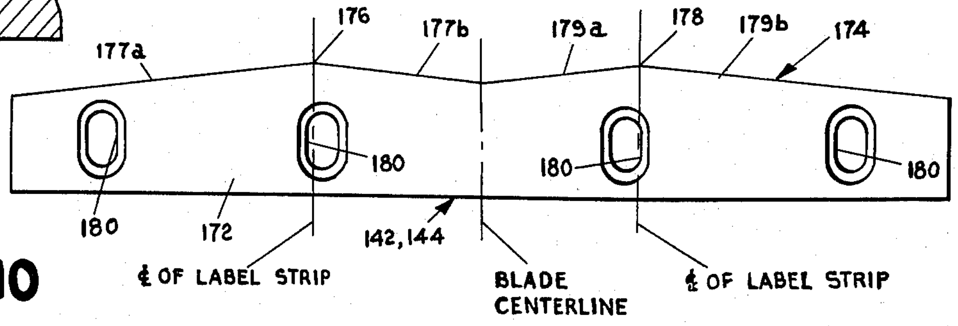
FIG. 10 is a front elevation of the anti-twist cutting blade.

The primary difference between the cut-off means 140 and that described in U.S. Pat. No. 3,843,440 resides in the inclusion of two anti-twist cutting blades 142, 144. AS shown in FIGS. 10 and 11, each anti-twist cutting blade includes a generally flat, elongated body 172 having a length at least as great as the width of the label web 14 and including a pair of cutting edge vertexes 176, 178 formed along its cutting edge 174. Vertexes 176, 178 are formed by inclined edge surfaces 177*a* and 177*b* and 179*a* and 179*b*. A plurality of securing apertures 180 are also includes along the blade for securing the same to the mounting blocks 146, 148 with threaded screws 149 as shown in FIG. 9. The vertexes 176, 178 are spaced to be approximately on or aligned with the center line of each label strip (FIGS. 5 and 10). Thus, each side of the blade has an active cutting length approximating the width of one of the label strips.

In operation, the double vertex cutting blades 142, 144 are reciprocated upwardly through the plane of the label web with the vertexes 176, 178 first cutting through the labels and scrap sections in each longitudinal strip generally in the middle of the strip. Thereafter, each label or scrap section in each strip is cut progressively from the first cut at the location of the vertex toward the lateral edges of each strip along inclined surfaces 177*a*, 177*b*, and 179*a*, 179*b*. Accordingly, the strips are cut from their center portions outwardly. This method prevents the strips from being twisted toward the outside edges of the label web such that transfer and application of the labels in other parts of the apparatus is not impeded. Since the vertexes are centered for each label strip, the completion of the cutting of the side edges of each strip occurs substantially at the same time.

The spacing between the blades 142, 144 may be changed by rotation threaded rod 182 (FIG. 9) such that knife-mounting block 146 and knife-edge block 158 are together drawn away from or toward block 148 and 160 along rod 182 and guide rod 184. Hence, the spacing between the blades may be changed to accommodate different length labels.

Label Transfer Apparatus

Figure 13:
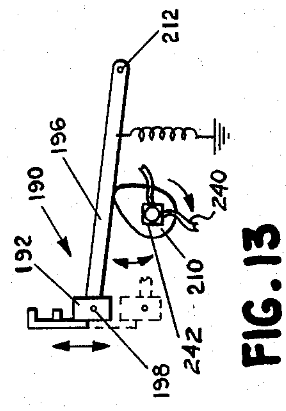
FIG. 13 is a schematic illustration of the camming means for reciprocating the label separators between their raised and lowered positions.

Located between the two cutting blades 142, 144 is the label transfer apparatus 190 which elevates and separates the individually cut pairs of labels from the plane immediately below that of the label web in the double knife to a higher, elevated plane where the pairs of labels are transferred to a label transfer platen 260 as shown in FIGS. 1, 8, and 9. Transfer apparatus 190 includes a rectangular mounting block 192 having a slot 194 in its upstream side in which is pivotally mounted a camming arm 196 (see FIGS. 7, 9, and 13). The end of camming arm 196 is secured to a pivot pin 198 mounted in a suitable bearing 200 extending across slot 194. A dove-tailed slide flange 202 is bolted to the opposite surface of mounting block 192 from camming arm 196. Flange 202 is received in a guide channel 204 secured by welding or the like to the upstanding framework of the labeler 208 and includes a dove-tailed side channel 206 having a cross-sectional shape corresponding to the converging side edges of flange 202. As is shown in FIG. 13, the entire transfer and spreading apparatus 190 is raised and lowered as guided by the side flange 202 sliding in channel 206 in response to the rotation of cam 210 pivoting camming arm 196 about pivot 212. Cam 210 is rotated by the main labeler motor mentioned above in response to the activation of a switch upon the completion of a cutting stroke by cut-off apparatus 140. Accordingly, the entire apparatus reciprocates between the plane immediately below that of the label web and a raised position where the labels are transferred to a heated transfer plate 260 which deposits them at the label application station 270 as shown in FIG. 1.

Secured to the top surface of mounting block 192 via bolts or the like is an arm-mounting block 214. Each of two pairs of spreader arms 216, 218 and 220, 222 are pivotally secured in parallelogram fashion to the arm-mounting block and pivotally support a pair of label separators 224*a* and 224*b*. Each label separator 224*a* and 224*b* includes a connecting plate 226 pivotally secured via pivot pins 228 in slots in the upper ends of one of the two pairs of spreader arms 216, 218 and 220, 222. Bolted to the upper edge of connecting plate 226 is a transfer block 230 atop which is secured a transfer plate 232 having a transfer gasket 234 intermediate plate 232 and block 230. Different length transfer plates 232 may be used to accommodate the different sizes of labels and spacings of blades 142, 144. Each of the transfer blocks 230 include an elongated, hollow vacuum chamber 236 recessed therewithin while transfer plates 232 include a plurality of passageways 238 extending to their top surfaces through sealing gasket 234 to the vacuum chambers 236. Flexible, plastic vacuum hoses 240 are connected to the vacuum chambers 236 through the bottom side surfaces of the transfer blocks and are positioned along the generally vertical side edges of connecting plates 226. Negative pressure is transmitted through tubes 240 to chamber 236 and the top surfaces of transfer plate 232 via passageways 238 in order to hold the individual labels thereon during the elevating and spreading motion of the transfer apparatus. When the apparatus reaches its raised position as shown in FIG. 8, conventional rotary valves 242 (FIG. 13) operated by cam shaft 210 cut off the vacuum to tubes 240 and thus to the top surfaces of plates 232, thereby releasing the negative pressure holding labels 15 on the top surfaces of the transfer plate.

Figure 7:
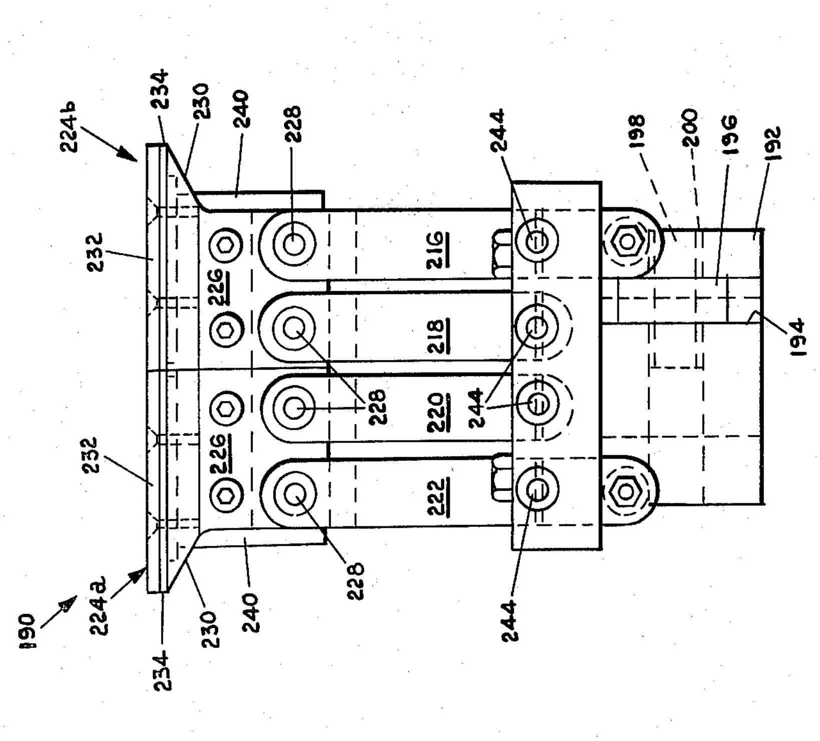
FIG. 7 is a front elevation of the label separators and spreading means therefor.

As is best seen from FIGS. 7 and 8, spreader arms 216, 218 and 220, 222 spread the label separators 224*a* and 224*b* apart from one another as mounting block 192 is raised vertically while simultaneously maintaining the generally planar top surfaces of transfer plates 232 in the same plane at all times. The lower ends of the spreader arms are pivotally secured to the mounting block 214 via pivot pins 244. Pins 244 are spaced apart horizontally the same distance as pins 228 in each pair of arms. A camming roller 246 is rotatably mounted on a suitable bearing on the extending lower ends of each of the outside spreader arms 216, 222 which are longer than arms 218, 220. Each roller 246 engages a vertically upstanding cam track 248, the cam tracks including inclined camming surfaces 250 which converge toward one another toward the upper ends of the tracks. Pivot pins 244 pivotally securing the lower portions of outside spreader arms 216, 222 to mounting block 214 extend completely through block 214 and include torsion springs 252 held in place by threaded collars 254 on the ends thereof. The torsion springs 252 rotationally bias the pivot pins 244 and constantly bias the spreader arm and label separators toward their spread positions as shown in FIG. 8 which also maintain cam rollers 246 in constant contact with cam track 250.

As apparatus 190 is raised and lowered, cam rollers 246 follow converging cam tracks 250 as biased by torsion springs 252 to rotate and pivot pairs of spreader arms 216, 218, and 220, 222 and thus separators 224*a* and 224*b* away from one another. Since the pivot pins 244 and 228 at either end of each pair of spreader arms are spaced apart equivalent distances and form a parallelogram relationship, the top label engaging planar surfaces of transfer blocks 232 are maintained parallel to one another and in the same plane at all times as the apparatus is raised and lowered. Accordingly, the individual pairs of cut labels 15 are spread apart and presented for receipt by the heated transfer platen 260 which reciprocates back and forth between a position adjacent the raised position of label transfer apparatus 190 and the label application station 270 as shown in FIGS. 1 and 8.

Heated transfer platen 260 includes heating shoes 262 including vacuum passageways 264. When the individual cut labels 15 are released from the top surfaces of transfer plate 232 on the label separators by the release of vacuum in tubes 240, the labels are drawn to the heated shoes 262 by the vacuum in passages 264 after which the platen is reciprocated to the lable application station. As illustrated in FIG. 1, suitable means for reciprocating platen 260 include an arm 266 from which the platen is suspended on rollers or bearings. The platen is moved along the arm by camming means powered by the above-mentioned main labeler drive motor.

The transfer platen includes a suitable electric circuit means for heating the shoes 262 (see FIG. 1). The double label web 14 preferably includes a layer of coating of heat-activatable adhesive of the conventionally known type such that when held against shoes 262 by a vacuum in passageways 264, heat from the platen will be transferred to the individual labels thereby activating the adhesive and readying the label for application to the product surface. Other types of conventionally known adhesives may also be used.

The specific apparatus of the label application station 270 forms no part of this invention. Generally, it includes appropriate apparatus for receiving the pairs of individual cut labels 15 from the transfer platen 260 and means for holding and rotation corresponding pairs of product surfaces such as smaller vials, bottles, dry cell batteries, or the like during which rotation of the label is secured at one end by its adhesive to the product surface and wrapped around the object.

OPERATION AND METHOD

The operation and method for cutting and transferring the individual pairs of labels will now be understood. The double label web is unwound from reel 12 by feed rollers 13. Upon a signal initiated by reader unit 20 which senses the registry marks 17 at the edge of each pair of labels 15 on web 14, the motor powering shaft 54 is activated thereby rotating feed rollers 126, 136 and circular slitter knives 42, 34 to advance the web therethrough. Rotation of the circular male slitter blade 42 against the female knife member 34 slits the double label web 14 longitudinally along its center line, dividing the label web into two longitudinal label strips.

Thereafter, the label strips are fed through a pair of Teflon-coated, glass cloth, label web guides 138 (FIG. 1) which maintain the two strips in edge-to-edge relationship in the same plane of flow. The leading pair of labels on the double label web 14 is advanced into position in cut-off means 140 and stopped over the pair of anti-twist, double vertex cutting blades 142, 144 as controlled by reader 20. The double knife is activated for its cutting stroke which separates the individual labels 15 from the label web 14 and any scrap section 19 from the individual labels 15. The cut labels are received by and rest on the top transfer surfaces 232 of label separators 224*a* and 224*b* which, after completion of the cutting stroke, are activated to elevate and spread the labels to the position shown in FIG. 8. During such transfer, the labels are held on the transfer surfaces 232 by vacuum which is shut off by rotary valves 242 when the label separators reach their uppermost position. Thereafter, the vacuum in passageways 264 in transfer platen 260 is activated, and the individual cut labels 15 are drawn to and held by the heated shoes 262. Transfer platen 260 is reciprocated to a position adjacent label application station 270 during which time the heated shoes 260 activate the heat-activatable adhesive on the labels. The label application station receives the activated pair of labels simultaneously, and simultaneously applies the same to a pair of product surfaces.

Accordingly, the labels are slit and cut from the label web in pairs and applied to the product surfaces simultaneously such that the overall feed of the labeling process is effectively doubled since twice as many product surfaces are labeled at the same time. Further, labeling security is maintained because identical labels are cut simultaneously from the same label web and applied simultaneously to product surfaces.

While one form of the invention has been shown and described, other forms will now be apparent to those skilled in the art. It will be understood that the embodiments. shown in the drawings and described above are merely for illustrative purposes, and are not intended to limit the scope of the invention which is defined by the claims which follow.

The embodiments of the invention in which an exclusive property or privilege is claimed are defined as follows:

1. Split labeling apparatus comprising means for advancing an elongated double label web; divider means for slitting the advancing double label web longitudinally into a pair of like strips; label cut-off means downstream of said divider means for simultaneously cutting off a pair of like individual labels from said strips, one label being cut from each strip; and label transfer means for transferring said pair of individual cut labels from said cut-off means to a label application station whereby said individual labels are applied to articles to be labeled; said label transfer means including a pair of label separators and spreading means for spreading apart and changing the spacing between said separators and thus of said pair of individual labels cut from said strips whereby said labels are separated for transfer to the label application station.

2. The labeling apparatus of claim 1 wherein said spreading means further includes means for elevating said separators as they are spread apart by said spreading means whereby said individual labels are lifted for transfer to the label application station.

3. The labeling apparatus of claim 2 wherein said label cut-off means include a pair of spaced, label cut-off devices; said label separators and spreading means being located between said cut-off devices whereby when said individual labels are cut from the label web, they are engaged by and rest on said separators.

4. The labeling apparatus of claim 2 wherein said separators include a pair of aligned transfer blocks each having generally planar top label engaging surfaces; said spreading and elevating means including pivotal support means for maintaining said top label engaging surfaces generally in the same plane at all times as they are lifted and spread apart and means for reciprocating said separators between a first position wherein said separators abut one another adjacent the level of said cut-off means and a second position generally above said cut-off means.

5. The labeling apparatus of claim 4 wherein said pivotal support means include a pair of parallel spreader arms for each transfer block, each spreader arm having two ends; an arm mounting block; and pivot pin means for pivotally securing a first end of each spreader arm in each of said pairs to said mounting block and the second end of each spreader arm in each of said pairs to one of said transfer blocks, said first and second arm ends in each pair being spaced apart equally whereby said arms form a parallelogram support for each transfer block which maintains said top label engaging surfaces in the same plane as said transfer blocks are pivotally spread apart on said spreader arms; one of said spreader arms in each pair having an extending portion on its first end and a cam roller rotatably mounted on said extending portion; a pair of inclined cam tracks for engaging said cam rollers as said transfer means are raised and lowered, said cam tracks converging toward one another such that said cam rollers cause said pairs of spreader arms and thus said transfer blocks to pivot away from one another as said spreading means is elevated; and biasing means for urging said pairs of spreader arms and transfer blocks away from one another and for maintaining camming engagement between said cam tracks and rollers.

6. The labeling apparatus of claim 4 wherein said reciprocating means include guide channel means for vertically slidably mounting said arm mounting block and camming means for raising and lowering said arm mounting block, and thus said separators and spreading and elevating means, as guided by said guide channel means.

7. The labeling apparatus of claim 4 wherein said top label engaging surfaces are included on label support plates removably secured to said transfer blocks whereby different support plates may be substituted to support labels of different sizes.

8. The labeling apparatus of claim 4 wherein said transfer blocks include vacuum hold-down means for providing a negative pressure at said top label engaging surfaces to retain said labels thereon during transfer.

9. The labeling apparatus of claim 1 wherein said advancing means includes means for advancing said web through said cut-off means generally in a single plane of flow; said label cut-off means including a generally flat elongated anti-twist cutting blade mounted generally transverse to said label web and having a length at least as great as the width of said label web, and means for reciprocating said blade through said plane of flow of said label web; said blade having a center line dividing said blade into two halves each having an active cutting length approximating the width of one of said label strips, side edges, and a cutting edge extending along the length of said blade, said cutting edge including a pair of inclined surfaces leading to a vertex on each side of said center line, said inclined surfaces and vertexes being adapted to simultaneously separate an individual label from each of said strips by each cutting generally from the central portion of each of said strips outwardly to either side edge thereof whereby said web is prevented from twisting out of its plane of flow.

10. The labeling apparatus of claim 9 wherein said vertexes are each located generally on the center line of one of said label strips such that completion of the cutting of the side edges of each label strip occurs substantially at the same time.

11. The labeling apparatus of claim 9 wherein said double label web includes pairs of labels printed sequentially along its length, each pair of labels being aligned across the width of said web, and periodic scrap sections extending across the width of said web; said cut-off means including knife means for the separation of said labels and said periodic scrap sections in one operation, said knife means comprising a double-bladed knife, the first of said blades being the firstr blade to be encountered by said label web as it flows over said blades, such that the first of said blades is arranged to separate the labels to be applied to said product surfaces from said label web and the second of said blades is arranged to simultaneously separate any periodically occurring scrap sections from said labels, said first and second blades operating simultaneously and in unison at all times such that said label web, labels, and scrap section, if any, separated at one time and on the same stroke of said simultaneously operating blades; each of said blades being one of said anti-twist cutting blades.

12. The labeling apparatus of claim 11 including means for adjusting at least one of said blades along the direction of flow of said label web with respect to the other of said blades to accommodate various label sizes.

13. In a labeling apparatus for a double label web having pairs of labels printed sequentially along its length and periodic scrap sections, said web being supplied from a roll, said apparatus including means for advancing said labels to a label application station where said labels are applied to product surfaces, the improvement comprising: divider means for slitting the advancing double label web into a pair of like strips whereby said labels may thereafter be individually separated from said strips; label cut-off means downstream of said divider means for simultaneously cutting off a pair of individual labels from said strips, one label being cut from each strip; label transfer means for transferring said pair of individual cut labels from said cut-off means to the label application station, said label transfer means including a pair of label separators and spreading means for spreading apart and changing the spacing between said separators and thus of said pair of individual labels from said strips whereby said labels are separated for transfer to the label application station.

14. The improvement of claim 13 wherein said cut-off means includes a generally flat, elongated anti-twist cutting blade mounted generally transverse to said label web and having a length at least as great as the width of said label web, and means for reciprocating said blade through said plane of flow of said label web; said blade having a center line dividing said blade into two halves each having a length approximating the width of one of said label strips, side edges, and a cutting edge extending along the length of said blade, said cutting edge including a pair of inclined surfaces leading to a vertex on each side of said center line, said inclined surfaces and vertexes adapted to simultaneously separate an individual label from each of said strips by each cutting generally from the central portion of each of said strips outwardly to either side edge thereof whereby said web is prevented from twisting out of its plane of flow.

15. The improvement of claim 13 wherein said spreading means further includes means for elevating said separators as they are spread apart by said spreading means whereby said individual labels are lifted for transfer to the label application station.

* * * * *

UNITED STATES PATENT AND TRADEMARK OFFICE

CERTIFICATE OF CORRECTION

PATENT NO. : 3,989,575

DATED : November 2, 1976

INVENTOR(S) : John R. Davies and Kornelis Platteschorre

It is certified that error appears in the above-identified patent and that said Letters Patent are hereby corrected as shown below:

Column 1, line 28:

"lableing" should be ---labeling---

Column 1, line 63:

"dividing" should be ---divider---

Column 2, line 55:

"raises" should be ---raised---

Column 3, line 51:

"inprinter" should be ---imprinter---

Column 4, line 4:

"pattern" should be deleted.

Column 6, line 19:

"place" should be ---placed---

Column 6, line 28:

After "to" insert ---the---

Column 6, line 36:

"to" should be ---of---

UNITED STATES PATENT AND TRADEMARK OFFICE

CERTIFICATE OF CORRECTION

PATENT NO. : 3,989,575

DATED : November 2, 1976

INVENTOR(S) : John R. Davies and Kornelis Platteschorre

It is certified that error appears in the above-identified patent and that said Letters Patent are hereby corrected as shown below:

Column 7, line 1:

After "inclined" insert ---cutting---

Column 7, line 3:

"includes" should be ---included---

Column 9, line 18:

"lable" should be ---label---

Column 9, line 38:

"rotation" should be ---rotating---

Column 12, line 9:

"firstr" should be ---first---

Column 12, line 17:

After "any," insert ---are---

Signed and Sealed this

First Day of February 1977

[SEAL]

*Attest:*

RUTH C. MASON
*Attesting Officer*

C. MARSHALL DANN
*Commissioner of Patents and Trademarks*